United States Patent [19]

Huynh et al.

[11] Patent Number: 4,682,266
[45] Date of Patent: Jul. 21, 1987

[54] OZONATOR POWER SUPPLY EMPLOYING A CURRENT SOURCE INVERTER

[75] Inventors: Anh N. Huynh, Edgewood, Ky.; Phoivos D. Ziogas, Brossard, Canada

[73] Assignee: National Distillers and Chemical Corporation, New York, N.Y.

[21] Appl. No.: 725,862

[22] Filed: Apr. 22, 1985

[51] Int. Cl.[4] ...................... H01T 23/00; H02M 7/521
[52] U.S. Cl. ...................................... 361/235; 363/96; 363/138; 323/903; 422/186.16
[58] Field of Search .................. 361/235; 363/96, 124, 363/135–138, 8, 24; 204/176; 422/186.15, 186.16; 323/903

[56] References Cited

U.S. PATENT DOCUMENTS

| 3,805,141 | 4/1974 | Pompa, Jr. et al. | 363/135 |
| 3,821,632 | 6/1974 | Rylicki | 363/96 |
| 3,939,392 | 2/1976 | Chalmers et al. | 363/96 |
| 4,051,045 | 9/1977 | Yamamoto et al. | 422/186.16 |
| 4,123,664 | 10/1978 | Yamamura et al. | 422/186.16 |
| 4,128,768 | 12/1978 | Yamamoto et al. | 422/186.16 |
| 4,442,483 | 4/1984 | Baumann et al. | 363/135 X |

FOREIGN PATENT DOCUMENTS 2929601 1/1981 Fed. Rep. of Germany .

OTHER PUBLICATIONS

Technique for Pulse Elimination in Pulsewidth—Modulation Inverter with no Waveform Discontinuity, D. Grant et al., IEEE Proc., vol. 129, Pt. B, No. 4, Jul. 1982.
SCR Applications Handbook, pp. 282–311.

Primary Examiner—L. T. Hix
Assistant Examiner—D. Rutledge
Attorney, Agent, or Firm—Kenneth D. Tremain; Gerald A. Baracka

[57] ABSTRACT

A solid state thyristor bridge inverter power supply for an ozonator in which the width and the amplitude of the ozonator current can be controlled and the ozonator voltage can be selectively reset. The power supply circuit includes a diode bridge rectifier for converting a commercial AC power main into a direct current power source which is coupled to a current source DC/AC inverter through a inductor and a current detecting circuit. A current amplitude control circuit controls the output current of the DC power source by comparing the output of the detecting circuit with a reference set point. Logic circuits are provided for controlling the frequency and the width of current pulses applied to the ozonator.

12 Claims, 6 Drawing Figures

OZONATOR POWER SUPPLY EMPLOYING A CURRENT SOURCE INVERTER

BACKGROUND OF THE INVENTION

1. Field of the Invention

The present invention relates generally to a solid state power supply circuit for a corona discharge device such as an ozonator, and more particularly pertains to a thyristor inverter power supply circuit employing a current source inverter with controlled gating of the thyristors.

2. Description of the Prior Art

It is known in the art that ozone can be produced by the passage of oxygen or air between two electrodes, between which an electrical corona discharge is maintained. Other processes for producing ozone, such as by spark discharge or by action of ultra-violet radiation, have not been of great industrial significance because the ozone yield is considerably lower. The production of ozone by a corona discharge is of considerable importance in broad areas of industry, for water treatment in the preparation of drinking water, and for water purification and sterilization.

The basic physical principles for synthesizing ozone by passing pure oxygen or other oxygen-containing gases such as air through a corona discharge device have been known for many years. In a typical corona discharge ozonator, a corona discharge is maintained across a gap between two electrodes and is characterized by a low current induced by a sufficiently large voltage gradient to cause an electrical corona discharge across the gas. The gas is only slightly ionized thereby and a diffused soft bluish glow results. The high voltages employed to operate corona discharge ozonators have frequently been obtained by passing a periodic signal of some type through the primary side of a step-up power transformer, and connecting the ozonator load across the periodic high voltage available on the secondary side of the transformer.

Over the years, significant efforts have been made to refine ozone generators and the power supplies therefor which form an integral part of their operating circuitry. These efforts have been particularly directed at increasing their efficiency to reduce both their cost of operation and the cost of manufacture of ozone per unit of power consumed. Many factors have contributed to setting prior art limitations of efficiency, including the characteristics of the voltage and current periodic waveforms.

Ozone forms according to a triple collision theory, pursuant to which oxygen molecules are accelerated in an alternating electric field, and three molecules of oxygen ($O_2$) reform to two molecules of ozone ($O_3$). The formation of ozone generally occurs in the last part of an acceleration phase when the corona discharge has built up a sufficient field strength, which occurs relatively late with sinusoidal AC voltages furnished from a commercial AC line voltage, or from a voltage derived therefrom in a multiplying operation producing a frequency of up to several hundred hertz.

Ozone generating systems operating at higher frequencies generally produce higher ozone yields, with normal AC line voltage, since the acceleratation per unit time appears more frequently. However, because the corona power dissipated in a gaseous gap in a series with a dielectric barrier is directly proportional to the operating frequency, any significant heating produced by this corona power tends to promote the rapid decomposition of ozone produced therein. Thus, the duration of the discharge in relation to the duration of the period of the alternating current applied to the ozonator is an important factor in the efficiency of the production of ozone.

SUMMARY OF THE INVENTION

It is a primary object of the present invention to provide an improved solid state thyristor bridge inverter power supply for an ozonator which provides a reliable control over the quantity of ozone produced thereby and which results in its efficient operation.

It is another object of the invention to provide a gating control circuit for a thyristor bridge inverter power supply for an ozonator in which the width and the amplitude of the ozonator current can be controlled and the ozonator voltage can be selectively reset.

In accordance with the teachings herein, a solid state power supply for an ozonator comprises a current-source thyristor bridge inverter with a reset voltage capability which supplies a variable width square wave current to a load circuit comprising a high voltage transformer coupled to an ozonator. The power supply circuit includes a diode bridge rectifier and a DC/DC chopper circuit for converting a commercial AC power main into a direct current power source which is coupled to the current-source inverter through an inductor and a current detecting circuit. A current amplitude control circuit controls the output current of the DC power source by comparing the output of the detecting circuit with a reference set point. Pulse width control logic circuits are provided for controlling the frequency and the width of current pulses applied to the ozonator load.

In greater detail, the thyristor bridge inverter comprises a first pair of thyristors and diodes coupled to conduct current in a first direction through the ozonator, and a second pair of thyristors and diodes coupled to conduct current in a second, opposite direction through the ozonator. A commutation circuit is also provided for commutating off the thyristors, and includes first and second commutating capacitors connected between the first and second pairs of thyristors. The commutation circuit further includes fifth, sixth, seventh and eighth commutating diodes connected respectively in parallel, with a reversed polarity, across each thyristor, such that each commutating diode can be forward biased by a commutating capacitor to turn off the thyristor across which it is connected.

A control circuit generates gating control signals for the thyristors, and controls the current pulses conducted through the ozonator load in a first direction by gating the first pair of thyristors on, and then by commutating one of the first pair of thyristors off by controlling the timing of a gating signal applied to one of the second pair of thyristors, which connects a charged commutating capacitor across and forward biases a commutating diode of one of the first pair of thyristors. The gating control circuit also controls the width of current pulses conducted through the ozonator in a second, opposite direction by gating the second pair of thyristors on, and then by commutating at least one of the second pair of thyristors off by controlling the timing of a gating signal applied to one of the first pair of thyristors, which connects a charged commutating capacitor across and forward biases a commutating diode of one of the second pair of thyristors.

In greater detail, the control circuit includes a pulse width modulator circuit for generating two square wave output signals. The pulse width modulator circuit is adjustable to control the pulse repetition frequency of the square wave output signals, and thereby the switching frequency of the gating control signals. The pulse width modulator circuit is also adjustable to control the width of the pulses in the square wave output signals, and thereby the width of the current pulses applied to the ozonator. This adjustment effectively adjusts the position of the leading edges of the current pulses. The control circuit further includes a monostable multivibrator circuit coupled to the output of the pulse width modulator circuit. The monostable multivibrator circuit generates a further pulse train, and is adjustable to control the width of the generated pulses, and thereby the width of the current pulses applied to the ozonator. This adjustment effectively adjusts the position of the trailing edges of the current pulses. The control circuit also includes an AND gate for each thyristor for generating gating signals therefor. A high frequency pulse train is coupled as an input to each AND gate to minimize dissipation losses in the gates of the thyristors.

In accordance with another aspect of the present invention, the control circuit includes an adjustable current pulse amplitude control circuit for controlling the amplitude of current pulses supplied through the thyristor bridge to the ozonator load. The current pulse amplitude control circuit generates a square wave output signal in accordance with its input signals, with the width of the pulses therein being selectively controllable to control thereby the amplitude of the current pulses supplied through the thyristor bridge to the ozonator load. The current pulse amplitude control circuit controls the output current of the DC power source depending upon a comparison of the output of the direct current detecting circuit with a reference set point. A power amplifier is coupled to the output of the square wave generating circuit through an optoisolator, and a DC inductor is connected between the DC power source and the current source inverter for providing a low ripple in the DC bus current. The ozonator load has an equivalent electrical circuit comprising a capacitor $C_d$ of the dielectric barrier, normally glass, connected in series with a capacitor $C_g$ of the air gap, connected across the secondary winding of the high voltage transformer, and has a conductance path, represented by $R_g$, when the corona discharge occurs.

BRIEF DESCRIPTION OF THE DRAWINGS

The foregoing objects and advantages of the present invention for a solid state power supply and control circuit for an ozonator may be more readily understood by one skilled in the art, with reference being had to the following detailed description of a preferred embodiment thereof, taken in conjunction with the accompanying drawings wherein like elements are designated by identical reference numerals throughout the several views, and in which.

DETAILED DESCRIPTION OF THE INVENTION

The power supply circuit of the present invention is designed to be particularly versatile, as the pulse repetition frequency of the power supply pulse train is adjustable, along with both the width and the amplitude of the ozonator current pulses.

The schematic circuits disclosed herein give the values of many of the resistors and capacitors shown therein, and additionally give the commercial designations of many of the diodes, transistors and integrated circuits which are a part of the circuits. In the latter case, the pin numbers of the individual integrated circuits are also indicated in many of the circuits.

Figure 1:
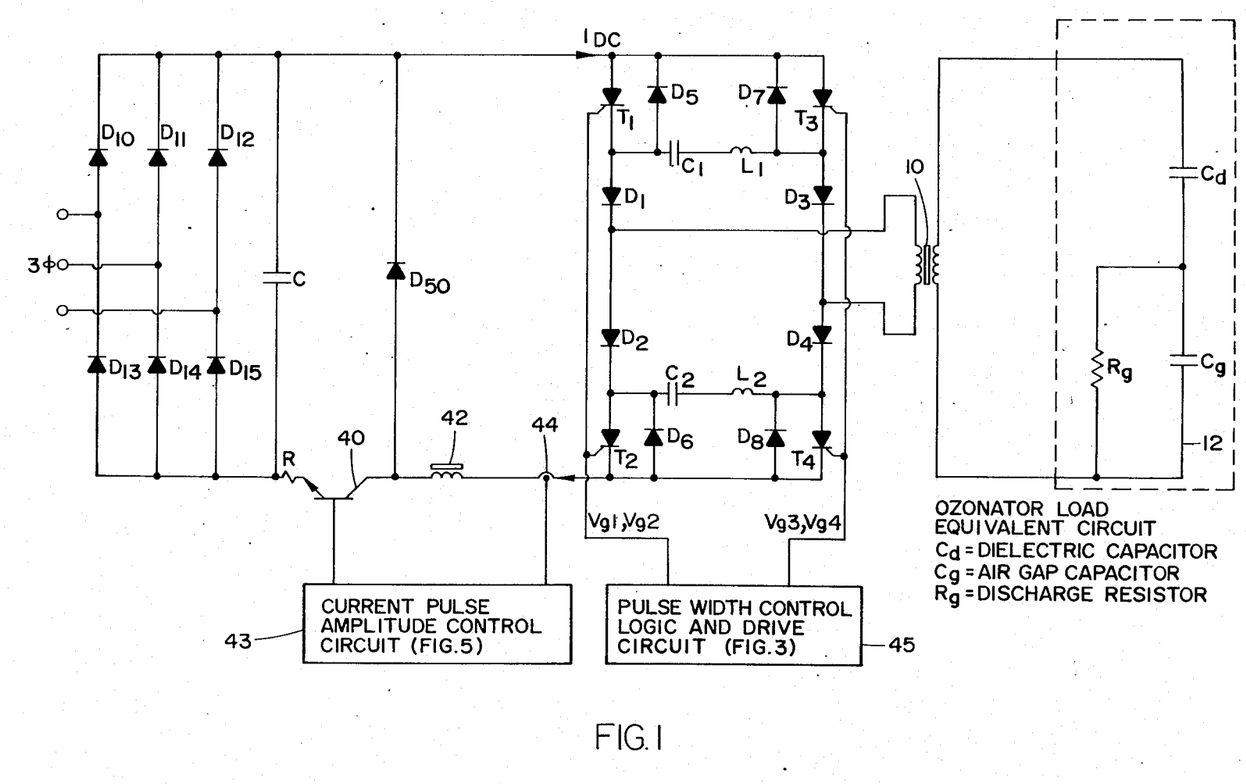
FIG. 1 is a schematic circuit diagram of an exemplary embodiment of a current source inverter power supply for an ozonator in accordance with the teachings of the subject invention.
Figure 2:
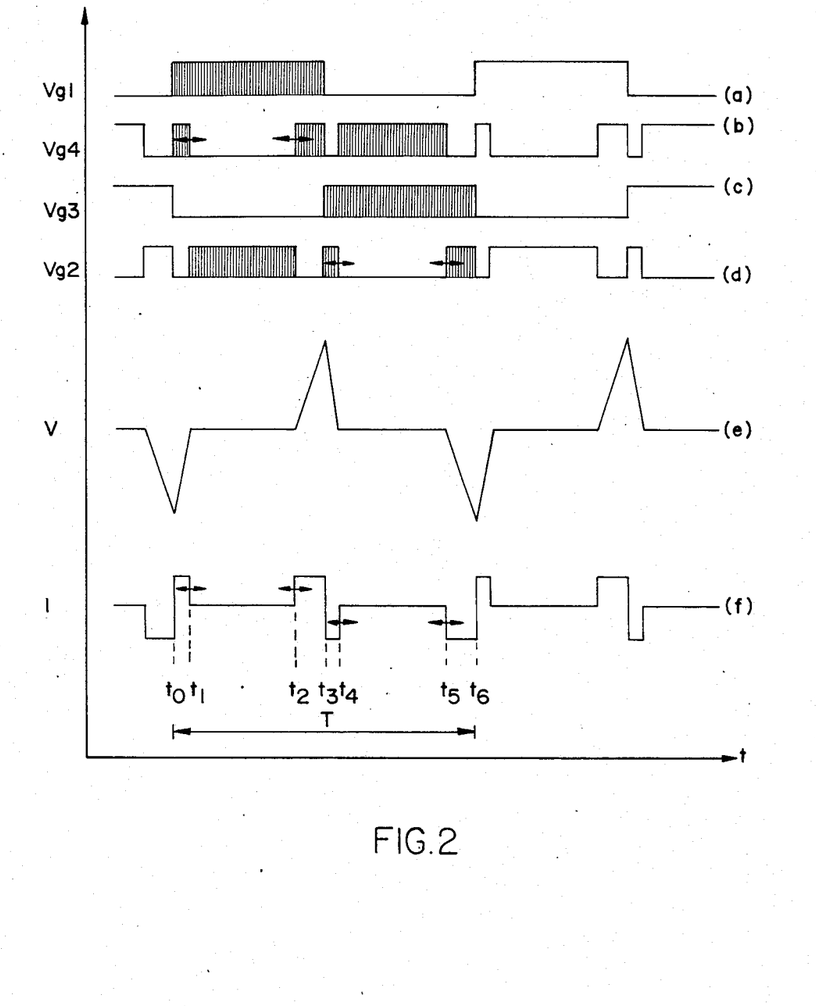
FIG. 2 illustrates several waveforms which are associated with and are useful in explaining the operation of the current source inverter circuit of FIG. 1.

Referring to FIG. 1, a commercial three phase 220V AC power main is rectified by a three phase diode bridge to produce a DC voltage, for example 300V, across a filter capacitor C, which is applied to DC/DC chopper comprising a power transistor 40, a fast switching diode $D_{50}$, a DC inductor 42, a current pulse amplitude control circuit 43, and a direct current detector 44. A current source inverter includes four thyristor-diode pairs $T_1$, $D_1$, $T_2$ $D_2$, $T_3$ $D_3$, and $T_4$ $D_4$, connected in a bridge configuration, along with two commutating circuits $L_1$ $C_1$ and $L_2$ $C_2$ and four commutating diodes $D_5$, $D_6$, $D_7$, and $D_8$, to convert a direct current from the DC power source to a current pulse train FIG. 2(f), which is imposed on an ozonator load 12 through a high voltage transformer 10. The operation of the current source inverter is controlled by a control logic and drive circuit 45 which supplies gating signals to the thyristors as described hereinbelow.

A thyristor is an electronic switching device which is triggered on by a gate pulse to turn it on in a high conduction mode. Once the thyristor is triggered into conducting a forward current, a gate signal is no longer required to maintain the device in conduction, and removal of the gate current does not affect the conduction of the forward current. The thyristor will return to its original forward blocking state if the forward current becomes zero (called natural commutating) or if it is forced to become zero (called forced commutation).

The thyristors, which are preferably silicon controlled rectifiers (SCRs), are used as the main switching devices for the current source inverter, and commutation of the thyristors is accomplished by the circuits $L_1$ $C_1$ and $L_2$ $C_2$ and the diodes $D_5$, $D_6$, $D_7$, and $D_8$ connected in an antiparallel fashion as shown in FIG. 1.

The current source inverter power supply circuit shown in FIG. 1 can also be implemented by using gate turn off (GTO) silicon controlled rectifiers field effect transistors (FET) or bipolar transistors. In this case, the components $D_5$, $D_6$, $D_7$, $D_8$ and $L_1$, $L_2$ and $C_1$, $C_2$ will be eliminated.

The operation of the power supply circuit (FIG. 1) will now be explained. Thyristors $T_1$ and $T_4$ operate in concert to supply current from the positive side of the power supply voltage, through thyristor $T_1$, downwardly through transformer load 10, and through thyristor $T_4$ to the negative side of the power supply voltage. Likewise, thyristors $T_2$ and $T_3$ also operate in concert to supply current form the positive side of the power supply voltage, through thyristor $T_3$, upwardly through transformer load 10 (opposite direction from thyristors $T_1$ and $T_4$), and through thyristor $T_2$ to the negative side of the power supply voltage. Thus, current pulses can be alternately imposed in opposite directions through transformer 10 and the ozonator load 12.

Referring to FIG. 1 and FIG. 2, a cycle of operation over a time period T is assumed to start at time $t_0$, proceeds through different switching times $t_1$, $t_2$, $t_3$, $t_4$, and $t_5$, and ends at time $t_6$, also corresponding to time to of the next cycle of operation. At time $t_0$, thyristors $T_1$ and $T_4$ are turned on by the gate pulses Vg1 and Vg4, and a current I (FIG. 2(f)) flows in a positive direction through the primary winding of the transformer 10 from the positive side to the negative side of the DC power source.

At time $t_l$, while thyristors $T_1$ and $T_4$ are still on, thyristor $T_2$ is turned on by the gate pulse Vg2, which causes diode $D_8$ to be forward biased by the resonant current of $L_2 C_2$ and turns thyristor $T_4$ off, terminating the positive current flow I. Consequently, the voltage V (FIG. 2(e)) across the primary winding of the transformer 10 has been quickly reset from its maximum negative peak to zero.

At time $t_2$, thyristor $T_2$ is commutated off when thyristor $T_4$ is again turned on by the gate pulse Vg4, causing a positive current I to again flow through the primary winding of the transformer in the same direction, and the voltage V rises from zero to its maximum positive peak.

At time $t_3$ (equal to T/2), when the voltage V reaches its maximum positive peak, thyristors $T_2$ and $T_3$ are turned on by the gate pulses Vg2 and Vg3, and the current I then starts to flow in a reverse negative direction through the primary winding of the transformer. When thyristors $T_2$ and $T_3$ are turned on, diodes $D_5$ and $D_8$ are forward biased by the resonant currents of $L_1 C_1$ and $L_2 C_2$, and thyristors $T_1$ and $T_4$ are turned off.

At time $t_4$, while thyristors $T_2$ and $T_3$ are still on, thyristor $T_4$ is turned on by the gate pulse Vg4, which causes diode $D_6$ to be forward biased by the resonant current of $L_2 C_2$, turning thyristor $T_2$ off, and terminating the negative current I flow. The voltage V has been quickly reset from its maximum positive peak to zero.

At time $t_5$, thyristor $T_2$ is turned on again by the gate pulse Vg2, and a negative current I starts to flow through the primary winding of the transformer. The voltage V drops from zero to its maximum negative peak.

At time $t_6$, which is also the beginning $t_0$ of the next cycle of the switching fequency, when the voltage V reaches its maximum negative peak, thyristors $T_1$ and $T_4$ are again turned on and the cycle of operation is repeated. Consequently, a rectangular current of alternating polarity and an alternating voltage, as shown in FIG. 2(f) and FIG. 2(e), are introduced to the ozonator load through the high voltage transformer. The rise time of the voltage is controlled by the width of the current pulses $t_2$ to $t_3$ and $t_5$ to $t_6$, and the reset time of the voltage is controlled by the width of the reverse polarity current pulses $t_0$ to $t_1$ and $t_3$ to $t_4$.

An inverter pulse width control logic and drive circuit pursuant to the present invention is designed to produce the gate pulses Vg1, Vg2, Vg3 and Vg4, FIG. 2, a through d, for the thyristor bridge, which enables the load voltage to be reset to zero in accordance with the variation of the load current width. Details of the control circuit and its associated waveforms are shown in FIG. 3 and FIG. 4.

Figure 3:
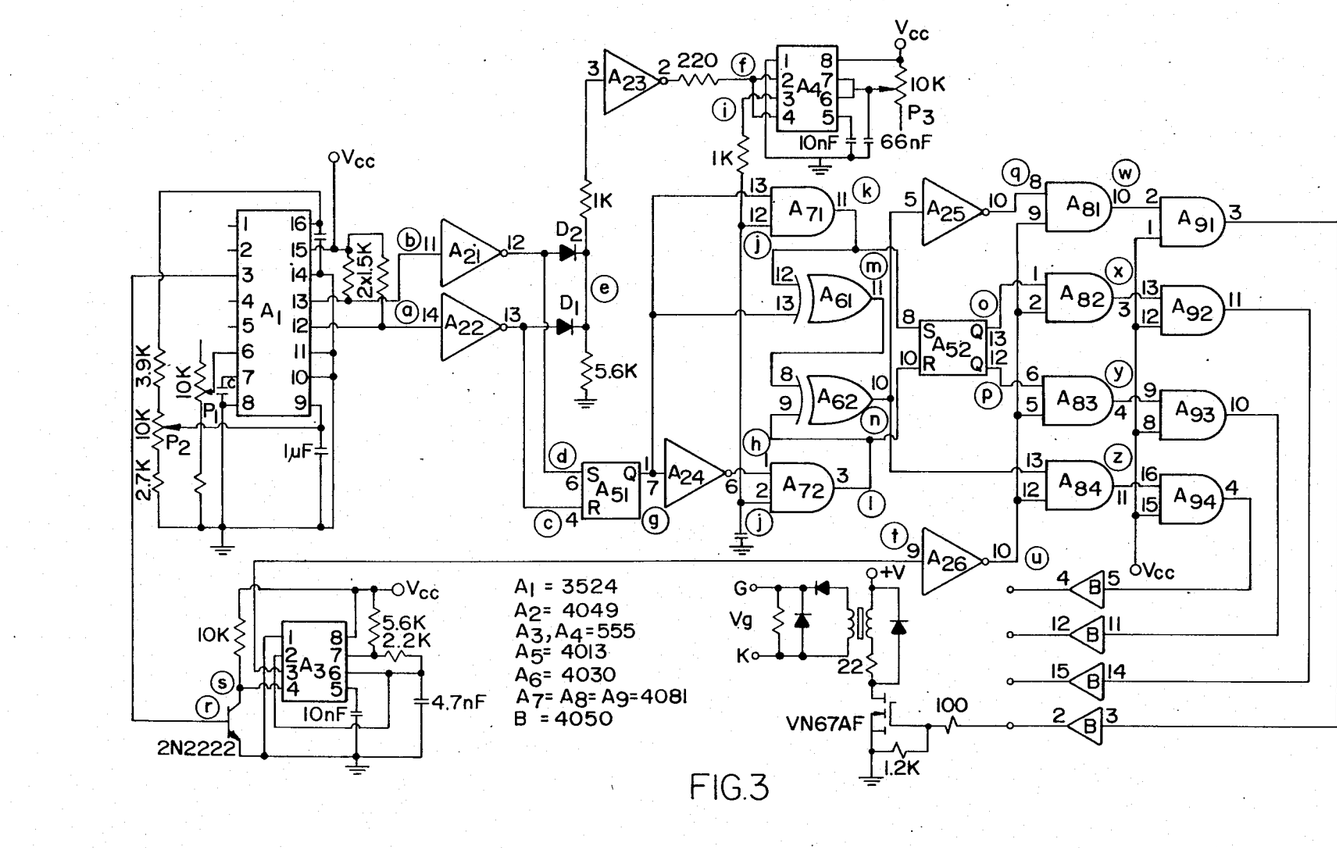
FIG. 3 is a schematic of an exemplary inverter control circuit pursuant to the teachings of the present invention for controlling the operation of the current source inverter circuit.
Figure 4A:
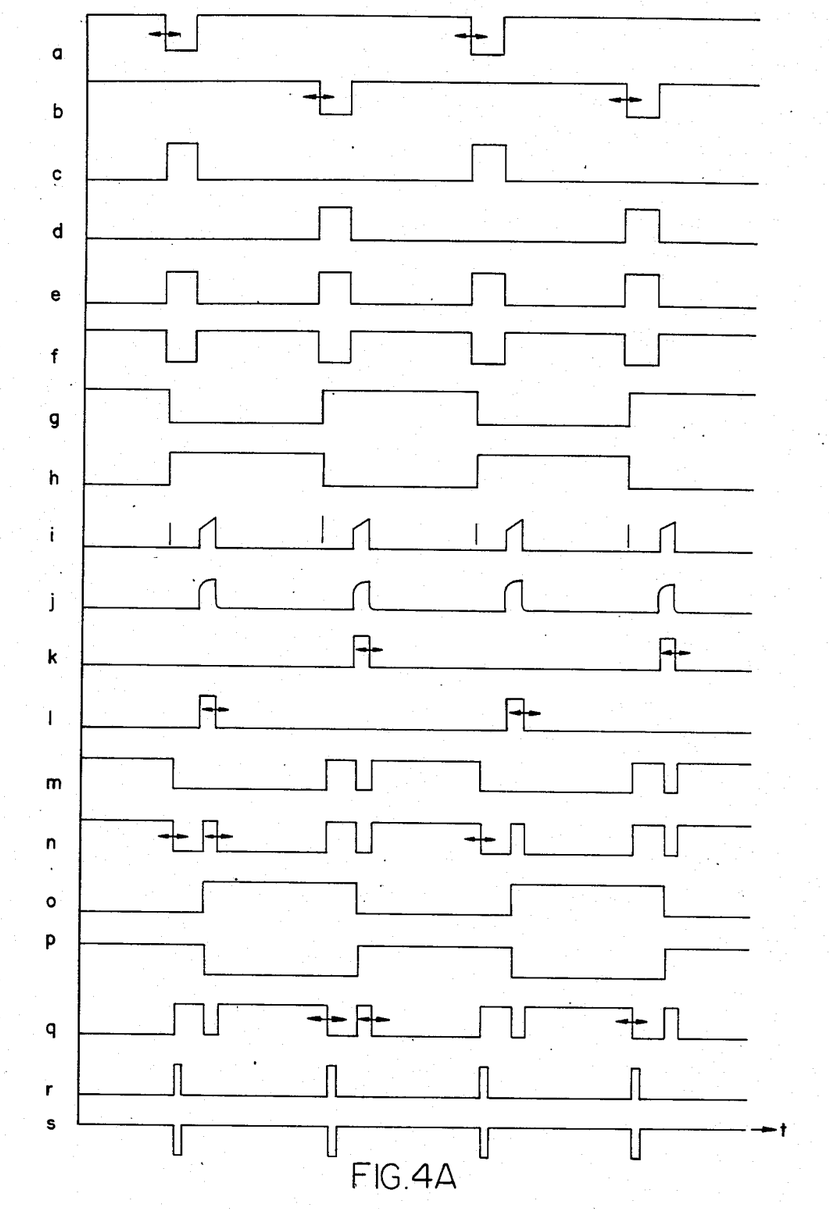
FIGS. 4A and 4B illustrate several waveforms which are associated with and are useful in explaining the operation of the control circuit of FIG. 3.
Figure 4B:
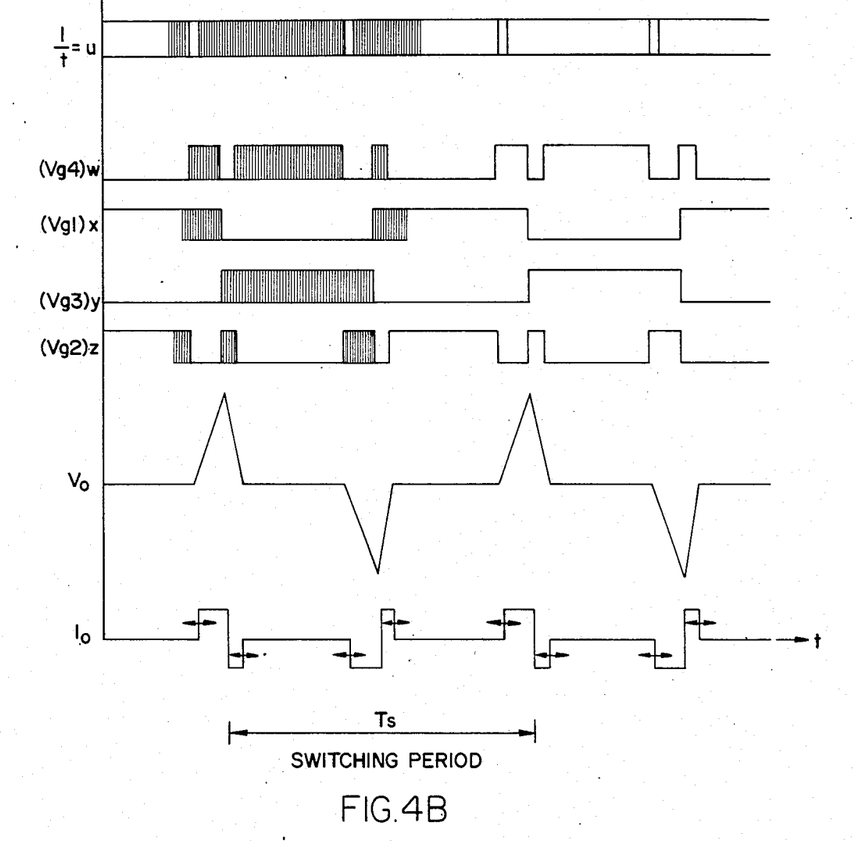

Referring to FIG. 3, a regulated pulse width modulator integrated circuit $A_1$ generates a pair of 180° out-of-phase square wave signals, a and b, see FIG. 4, which are inverted to square wave signals c and d by two inverting buffers $A_{21}$ and $A_{22}$. The frequency and the width of these square wave signals are manually controllable by the potentiometers $P_1$ and $P_2$ respectively, connected as shown. The outputs d and c of $A_{21}$ and $A_{22}$ are coupled respectively to the set and reset inputs of a D flip-flop $A_{51}$, and are also connected together by diodes $D_1$ and $D_2$ to produce a pulse train e at twice the PRF frequency. The signal e at the output of the two diodes is inverted by an inverting buffer $A_{23}$ to produce an inverted pulse train f. The Q output signal g of the D flip-flop $A_{51}$ is also inverted by an inverting buffer $A_{24}$ to form an inverted signal. The Q output signal g of the D flip-flop $A_{51}$ changes from a logical "zero" level to a logical "one" level when the set input changes from a logical "zero" level to a logical "one" level and the reset input remains unchanged at a logical "zero" level, and vice-versa.

The pulse train f is directed to the input of a timer $A_4$ used as a monostable multivibrator to produce a pulse train i, the width of the pulses of which is controlled manually be a potentiometer $P_3$, connected as shown. A pair of two-input AND gate $A_{71}$ and $A_{72}$ have one of their inputs coupled to the Q output g of the D flip-flop $A_{51}$ and to the output h of an inverting buffer $A_{24}$ respectively, and have their remaining inputs coupled to the output of the monostable multivibrator $A_4$ through an RC integrating circuit which changes the shape of the pulses in pulse train i to those of pulse train j.

The outputs of the AND gates $A_{71}$ and $A_{72}$ are coupled respectively to one input of a pair of two-input XOR gates $A_{61}$ and $A_{62}$. The remaining input of the XOR gate $A_{62}$ is coupled to the output of the XOR gate $A_{61}$, and the remaining input of the XOR gate $A_{61}$ is coupled to the Q output of the bistable multivibrator $A_{51}$. The outputs of the AND gates $A_{71}$ and $A_{72}$ are also coupled to the set and reset inputs of a second D flip-flop $A_{52}$. As is well known in the art, the output of an AND gate changes from a logical "zero" level to a logical "one" level only when both inputs are at a logical "one" level. The output of an XOR gate changes from a logical "zero" level to a logical "one" level when either (but only) one of their inputs is at a logical "one" level.

The output of XOR gate $A_{62}$ is coupled to one input of a two-input AND gate $A_{84}$, and is also coupled through an inverting buffer $A_{25}$ to one input of a two-input AND gate $A_{81}$. A pair of two-input AND gates $A_{82}$ and $A_{83}$ are coupled at their inputs to the outputs Q and $\overline{Q}$ of the D flip-flop A 52 respectively. The relatively low PRF frequency pulse train k applied to the set input of, and the relatively low PRF frequency pulse train l applied to the reset input of, d flip-flop $A_{52}$ cause it to generate the o waveform at its Q output and the p waveform at its $\overline{Q}$ output.

The q, o, p, and n waveforms applied respectively to the inputs of quad two-inputs and gates $A_{81}$, $A_{82}$, $A_{83}$, and $A_{84}$ are essentially the gating signals Vg4, Vg1, Vg3, and Vg2 explained with reference to FIGS. 1 and 2, subjected to further signal processing for reasons described hereinbelow.

The remaining inputs of the two-input AND gates $A_{81}$, $A_{82}$, $A_{83}$, and $A_{84}$ are connected together and coupled through an inverting buffer $A_{26}$ to the output of a timer $A_3$ functioning as an astable multivibrator. A high frequency pulse train generated by the astable multivibrator $A_3$ is utilized for the gating signals for the thyristors to minimize dissipation losses in the gates of the thyristors. Synchronization between the high frequency pulse train generated by $A_3$ and the control frequency generated by $A_1$ is provided by coupling an output r of $A_1$ through a transistor inverter 2N2222 to apply a synchronizing pulse train s to the high frequency generator $A_3$.

Quad two-input AND gates $A_{91}$, $A_{92}$, $A_{93}$, and $A_{94}$ are coupled at their inputs to the outputs of the two-input AND gates $A_{81}$, $A_{82}$, $A_{83}$, and $A_{84}$ respectively, and have their remaining inputs connected together and coupled to the positive voltage $V_{cc}$ in an arrangement designed to prevent each AND gate from fault triggering. The outputs of the AND gates $A_{91}$, $A_{92}$, $A_{93}$, and $A_{94}$ are then buffered by four non-inverting buffers $B_1$, $B_2$, $B_3$, and $B_4$. The outputs of the noninverting buffers $B_1$, $B_2$, $B_3$, and $B_4$ form gating signals for the thyristor bridge inverter which are amplified by four transistor amplifiers, only one of which is shown. Each amplified signal is isolated by a pulse transformer and rectified before being applied to the gate of a thyristor.

Figure 5:
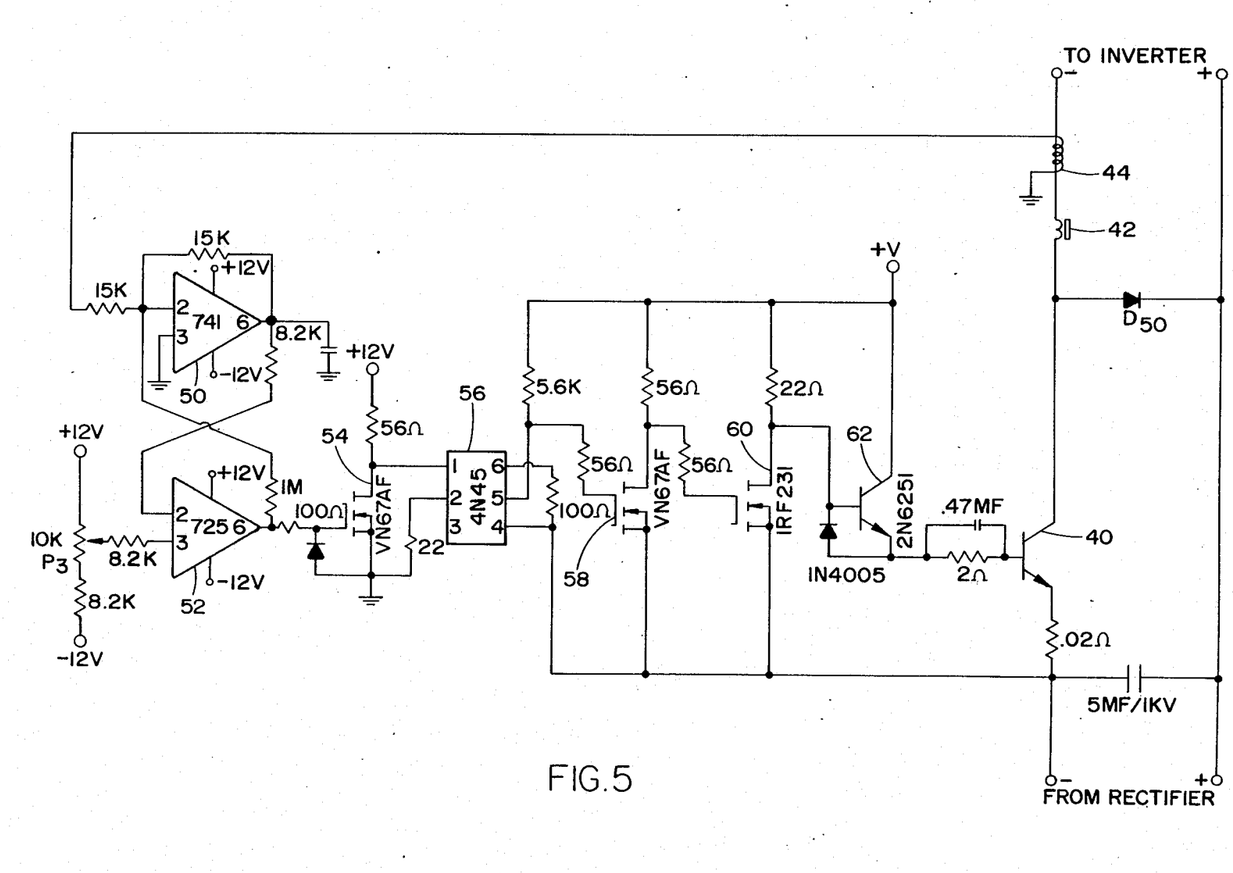
FIG. 5 is a schematic circuit of an exemplary embodiment of a current pulse amplitude control circuit pursuant to the teachings of the present invention.

FIG. 5 illustrates a schematic circuit of a DC/DC chopper circuit for controlling the amplitude of the current pulses supplied to the ozonator load. A power transistor 40, used as a switching device, supplies a regulated DC current to the inverter through a relatively large inductance 42. A free wheeling diode $D_{50}$ is provided to release the energy stored in the inductor 42 when the power transistor 40 is turned off. The logic circuit of FIG. 5 controls the current supplied through transistor 40 as follows. Two operational amplifiers 50 and 52 are coupled together to generate a fixed frequency square wave output signal in accordance with two input signals applied thereto. One input signal to operational amplifier 50 is a feedback signal from the current sensor 44, as illustrated in both FIG. 1 and FIG. 5, while one input signal to operational amplifier 52 is adjustable according to the setting of a potentiometer $P_{30}$. The setting of potentiometer $P_{30}$ controls the amplitude of the ozonator current by controlling the width of the square wave output signal, while the signal from the current sensor 44 serves as a feedback signal to ensure proper and stable operation of the circuit.

The square wave output signal from operational amplifiers 50 and 52 is directed to a transistor amplifier 54, the output of which is direct to an optical coupler 56. The output of the optical coupler 56 is directed through three stages of transistor amplifiers 58, 60, 62, the output of which is coupled to the base of the power transistor 40. The circuit effectively controls the magnitude of the current supplied to the thyristors $T_1$, $T_2$, $T_3$, and $T_4$ in accordance with the settling of potentiometer $P_{30}$.

In the control circuits described hereinabove, the time period T (FIG. 2f) of one gating cycle is controlled by potentiometer $P_1$, which controls the switching frequency of square wave generator $A_1$, while the width of each voltage pulse V (FIG. 2(e) is controlled by potentiometers $P_2$ and $P_3$, with potentiometer $P_2$ controlling the width of the first portion (falling or rising) of each voltage pulse V to its peak by controlling the position of the leading edge of the voltage pulse, and potentiometer $P_3$ controlling the width of the second portion (falling or rising) of each voltage pulse V from its peak to zero by controlling the position of the trailing edge of the voltage pulse. Moreover, the setting of potentiometer $P_{30}$ controls the amplitude of the ozonator current.

In preferred embodiments of the present invention, the current pulse repetition frequency is adjustable between 200 Hz and 800 Hz, the current pulse width is adjustable between 1800 and 300 microseconds for the first portion of the signal V, between 500 and 150 microseconds for the second portion of the signal V, and the current pulse height is adjustable between 1 and 10 amps.

While several embodiments and variations of the present invention for a current source inverter power supply circuit are described in detail herein, it should be apparent that the disclosure and teachings of the present invention will suggest many alternative designs to those skilled in the art.

What is claimed is:

1. A current source inverter power supply circuit for supplying substantially rectangular current pulses of alternating polarity, alternating in a cycle from a base level to a positive rectangular current pulse, returning to the base level, and then alternating to a negative rectangular current pulse, and then returning to the base level, and then repeating the cycle to generate rectangular current pulses of alternating polarity for an ozonator comprising:

(a) a DC/AC semiconductor switch bridge inverter coupled at its input terminals to a direct current power source and at its output terminals to an electrical load comprising a step up high voltage transformer having its primary winding coupled to said semiconductor bridge inverter and its secondary winding coupled to the ozonator, said semiconductor switch bridge inverter comprising a first semiconductor switch and series connected diode and a fourth semiconductor switch and series connected diode coupled to conduct current in a first direction through the primary winding of said high voltage transformer, and a second semiconductor switch and series connected diode and a third semiconductor switch and series connected diode coupled to conduct current in a second, opposite direction through the primary winding of said high voltage transformer, with each semiconductor switch having a positive electrode, a negative electrode and a gate control electrode;

(b) a forced commutation circuit for commutating off said semiconduc-or switches, including a first series connected commutating capacitor and inductor connected across the negative electrodes of the first and third semiconductor switches, and a second series connected commutating capacitor and inductor connected across the positive electrodes of the second and fourth semiconductor switches, and fifth, sixth, seventh and eighth commutating diodes connected respectively in parallel, with a reversed polarity, across each of said first, second, third and fourth semiconductor switches, such that each commutating capacitor and inductor coupled thereto to turn off the semiconductor switch across which it is connected; and (c) a control circuit for generating gating control signals for said semiconductor switches, said gating control circuit controlling the width of the positive substantially rectangular current pulses conducted through the ozonator load in a first direction by gating said first and fourth semiconductor switches on, and then commutating at least one of said first and fourth semiconductor switches off to return to the base level by controlling the timing of a gating signal applied to at least one of said second and third semiconductor switches, which connects a charged commutating capacitor and inductor across and forward biases a commutating diode of at least one of the first and fourth semiconductor switches, and said gating control circuit controlling the width of negative substantially rectangular current pulses conducted through the ozonator load in a second direction, opposite said first direction, by gating said second and third semiconductor switches on, and then commutating at least one of said second and third semiconductor switches off to return to the base level by controlling the timing of a gating signal applied to at least one of said first and fourth semiconductor switches, which connects a charged commutating capacitor and inductor across and forward biases a commutating diode of at least one of the second and third semiconductor switches.

2. A current source inverter power supply circuit for an ozonator as claimed in claim 1, each semiconductor switch comprising a thyristor.

3. A current source inverter power supply circuit for an ozonator as claimed in claim 1, said control circuit comprising a pulse width modulator circuit for generating at least one square wave output signal, with the pulse width modulator circuit being adjustable to control the pulse repetition frequency of each square wave output signal and thereby the switching frequency of the gating control signals, and the pulse width modulator circuit also being adjustable to control the width of the pulses in each rectangular wave output signal and thereby the width of the current pulses applied to the ozonator.

4. A current source inverter power supply circuit for an ozonator as claimed in claim 3, said pulse width modulator circuit being adjustable to control the width of the pulses in each square wave output signal and thereby the width of the current pulses applied to the ozonator by controlling the leading edges of the current pulses.

5. A current source inverter power supply circuit for a ozonator as claimed in claim 3, said control circuit further comprising a monostable multivibrator coupled to the output of said pulse width modulator circuit, said monostable multivibrator circuit generating a pulse train and being adjustable to control the width of the pulses in its pulse train and thereby the width of the current pulses applied to the ozonator.

6. A current source inverter power supply circuit for an ozonator as claimed in claim 5, said monostable multivibrator circuit being adjustable to control the width of the current pulses applied to the ozonator by controlling the trailing edges of the current pulses.

7. A current source inverter power supply circuit for an ozonator as claimed in claim 1, said control circuit further comprising a high frequency pulse train generator for generating a high frequency pulse train utilized as gating signals for said semiconductor switches to minimize dissipation losses in the gates of said semiconductor switches.

8. A current source inverter power supply circuit for an ozonator as claimed in claim 7, said control circuit including an AND gate for each semiconductor switch for generating gating signals therefor, and said high frequency pulse train being coupled as one input to each said AND gate.

9. A current source inverter power supply circuit for an ozonator as claimed in claim 1, further including a current pulse ampitude control circuit coupled in series with said direct current power source, the semiconductor switch bridge inverter, and the ozonator for supplying current to the semiconductor switch bridge inverter and the ozonator, and controlling the electrical power supplied to the semiconductor switch bridge inverter and the ozonator by controlling the amplitude of current pulses supplied through the adjustable current pulse amplitude control circuit to the semiconductor switch bridge inverter and the ozonator.

10. A current source inverter power supply for an ozonator as claimed in claim 9, said current pulse amplitude control circuit comprising a circuit means for generating a square wave output signal, with the circuit means being adjustable to control the width of the pulses in the square wave output signal and thereby the amplitude of the current pulses applied to the ozonator.

11. A current source inverter power supply circuit for an ozonator as claimed in claim 10, comprising an amplifier means coupled to the output of said circuit generating means.

12. A current source inverter power supply circuit for an ozonator as claimed in claim 11, comprising an inductor coupled to the output of said amplifier means for smoothing and filtering the current supplied therethrough to the semiconductor switches.

* * * * *